United States Patent
Nauka et al.

(10) Patent No.: US 10,974,322 B2
(45) Date of Patent: Apr. 13, 2021

(54) PHOTONIC FUSING

(71) Applicant: Hewlett-Packard Development Company, L.P., Houston, TX (US)

(72) Inventors: Krzysztof Nauka, Palo Alto, CA (US); Sivapackia Ganapathiappan, Palo Alto, CA (US); Howard S Tom, Palo Alto, CA (US); Kristopher J Erickson, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 191 days.

(21) Appl. No.: 15/570,367

(22) PCT Filed: Jul. 31, 2015

(86) PCT No.: PCT/US2015/043299
§ 371 (c)(1),
(2) Date: Oct. 30, 2017

(87) PCT Pub. No.: WO2017/023285
PCT Pub. Date: Feb. 9, 2017

(65) Prior Publication Data
US 2018/0147629 A1   May 31, 2018

(51) Int. Cl.
*B22F 10/00* (2021.01)
*B33Y 30/00* (2015.01)
(Continued)

(52) U.S. Cl.
CPC .............. *B22F 10/00* (2021.01); *B33Y 10/00* (2014.12); *B33Y 30/00* (2014.12); *B33Y 50/02* (2014.12); *B22F 10/10* (2021.01); *Y02P 10/25* (2015.11)

(58) Field of Classification Search
None
See application file for complete search history.

(56) References Cited

U.S. PATENT DOCUMENTS 7,270,528 B2 * 9/2007 Sherwood ........... B29C 35/0805
425/174.4
10,124,408 B2 * 11/2018 Kenney ................ B22F 3/1055
(Continued)

FOREIGN PATENT DOCUMENTS

| CN | 1500608 | 6/2004 |
| CN | 1741895 | 3/2006 |

(Continued)

OTHER PUBLICATIONS

Hyunkyoo Kang et al, Direct Intense Pulsed Light Sintering of Inkjet-Printed Copper Oxide Layers within Six Milliseconds, Applied Materials and Interfaces (Year: 2014).*
(Continued)

*Primary Examiner* — Anthony J Zimmer
*Assistant Examiner* — Michael J Kachmarik
(74) *Attorney, Agent, or Firm* — HP Inc. Patent Department

(57) ABSTRACT

Example described herein include a three-dimensional printer a threedimensional printing device that includes a fusible material applicator to apply a layer of fusible material, a inhibiting material applicator to apply a patterned layer of inhibiting material to establish exposed regions of the layer of fusible material and blocked regions of the layer of fusible material based on information corresponding to a three-dimensional model, and a photonic energy emitter to apply photonic energy to fuse the exposed regions of the layer of fusible material.

14 Claims, 4 Drawing Sheets

(51) Int. Cl.
*B33Y 50/02* (2015.01)
*B33Y 10/00* (2015.01)
*B22F 10/10* (2021.01)

(56) References Cited

U.S. PATENT DOCUMENTS

| | | |
|---|---|---|
| 2004/0018107 A1 | 1/2004 | Khoshnevis |
| 2004/0173945 A1 | 9/2004 | Khoshnevis |
| 2006/0244169 A1* | 11/2006 | Monsheimer ......... B29C 64/153 264/113 |
| 2007/0238056 A1 | 10/2007 | Baumann et al. |
| 2008/0286488 A1 | 11/2008 | Li et al. |
| 2009/0017220 A1 | 1/2009 | Muller et al. |
| 2009/0267269 A1 | 10/2009 | Lim et al. |
| 2014/0314613 A1 | 10/2014 | Hopkinson et al. |
| 2014/0333916 A1 | 11/2014 | Bessonov |
| 2017/0173696 A1* | 6/2017 | Sheinman ................ B22F 3/16 |

FOREIGN PATENT DOCUMENTS

| | | |
|---|---|---|
| CN | 101553355 | 10/2009 |
| CN | 101642809 | 2/2010 |
| CN | 101653827 | 2/2010 |
| CN | 101932429 | 12/2010 |
| CN | 1976799 B | 4/2012 |
| CN | 103842157 | 6/2014 |
| JP | 2004114685 | 4/2004 |
| JP | 2007534524 | 11/2007 |
| JP | 2010509092 | 3/2010 |
| JP | 2011518694 | 6/2011 |
| JP | 2014527481 | 10/2014 |
| WO | WO-2013-021173 | 2/2013 |
| WO | WO-2014118783 | 8/2014 |
| WO | WO-2015106816 A1 | 7/2015 |
| WO | WO-2015106844 A1 | 7/2015 |
| WO | WO-2015108546 A2 | 7/2015 |
| WO | WO-2015180703 A1 | 12/2015 |

OTHER PUBLICATIONS

Martin Helgesen, Rapid flash annealing of thermally reactive copolymers in a roll-to-roll process for polymer solar cells, Polymer Chemistry (Year: 2012).*
Hak-Sung Kim, Intense pulsed light sintering of copper nanoink for printed electronics, Applied Physics A Materials Science Processing (Year: 2009).*
K. Schuetz, Selective light sintering of Aerosol-Jet printed silver nanoparticle inks on polymer substrates, AIP Conference Proceedings 1593 (Year: 2014).*
Khoshnevis, Chapter 8 selective inhibition of sintering, Rapid prototyping theory and practive, Springer, (Year: 2006).*
Martin Hedges, 3D Aerosol Jet Printing—Adding Electronics Functionality to RP/RM, OPTOMEC, (Year: 2012).*
Kenneth Spring, Non-Coherent Light Sources for Confocal Microscopy, Microscopy Resource Center, Olympus America (Year: 2012).*
Gibson, Additive Manufacturing Technologies Rapid Prototyping to Direct Digital Manufacturing, Springer, (Year: 2010).*
Saad Ahmed, Low Temperature Photonic Sintering for Printed Electronics, Xenon Corporation, Sep. 8, 2012. (Year: 2012).*
Combining Additive Manufacturing and Direct Write for Integrated Electronics—A Review K. Blake Perez and Christopher B. Williams Oct. 10, 2013.
Khoshnevis B. et al. "SIS—A New SFF Method Based on Powder Sintering", Proceedings Solid Freeform Fabrication Symposium 2003, Aug. 4-6, 2003, University of Texas, US, Aug. 5, 2002 (Aug. 5, 2002), pp. 448-447.

* cited by examiner

PHOTONIC FUSING

BACKGROUND

Three-dimensional printing, otherwise known as "3D printing", involves processes by which a machine transforms machine readable instructions into a three-dimensional physical object. The machine readable instructions often include an electronic or digital model that describes the dimensions and configuration of the physical object. The materials and the corresponding characteristics of the physical object can vary based on the particular process used in the three-dimensional printing process.

DETAILED DESCRIPTION

Example implementations of the present disclosure include systems, apparatuses, and methods for three-dimensional, or "3D", printing using photonic fusing of powdered, slurry, or liquid fusible material. In such implementations, the layers of fusible material are built up on top of one another. The structure of each layer is defined by printing or otherwise applying a pattern using an inhibiting material, such as a non-fusing absorptive material, a non-fusing reflective material, or a material that chemically or physically inhibits the fusible material from fusing.

Each combination layer of fusible material and inhibiting material can be exposed to photonic energy. As used herein, the terms "photonic energy" and "photonic fusing" refer to energy or processes that involve non-coherent light emissions with a spectral range of approximately 0.2 microns to 1.5 micron. In various implementations, the photonic energy can be applied to all or portions of a topmost layer simultaneously in controlled bursts or flashes. In response to the photonic energy, regions of the topmost layer of fusible material not obscured or inhibited by the inhibiting material can be purified, fused, melted, vaporized, or ablated. In some examples, the fusing of the fusible material in response to the photonic energy occur on an inner-layer and inter-layer basis. In such implementations, regions of the fusible material obscured/inhibited by the inhibiting material can remain in an unfused state. Specific details of the three-dimensional printing processes and apparatuses are described in more detail herein in reference to various examples and the accompanying figures.

Figure 1:
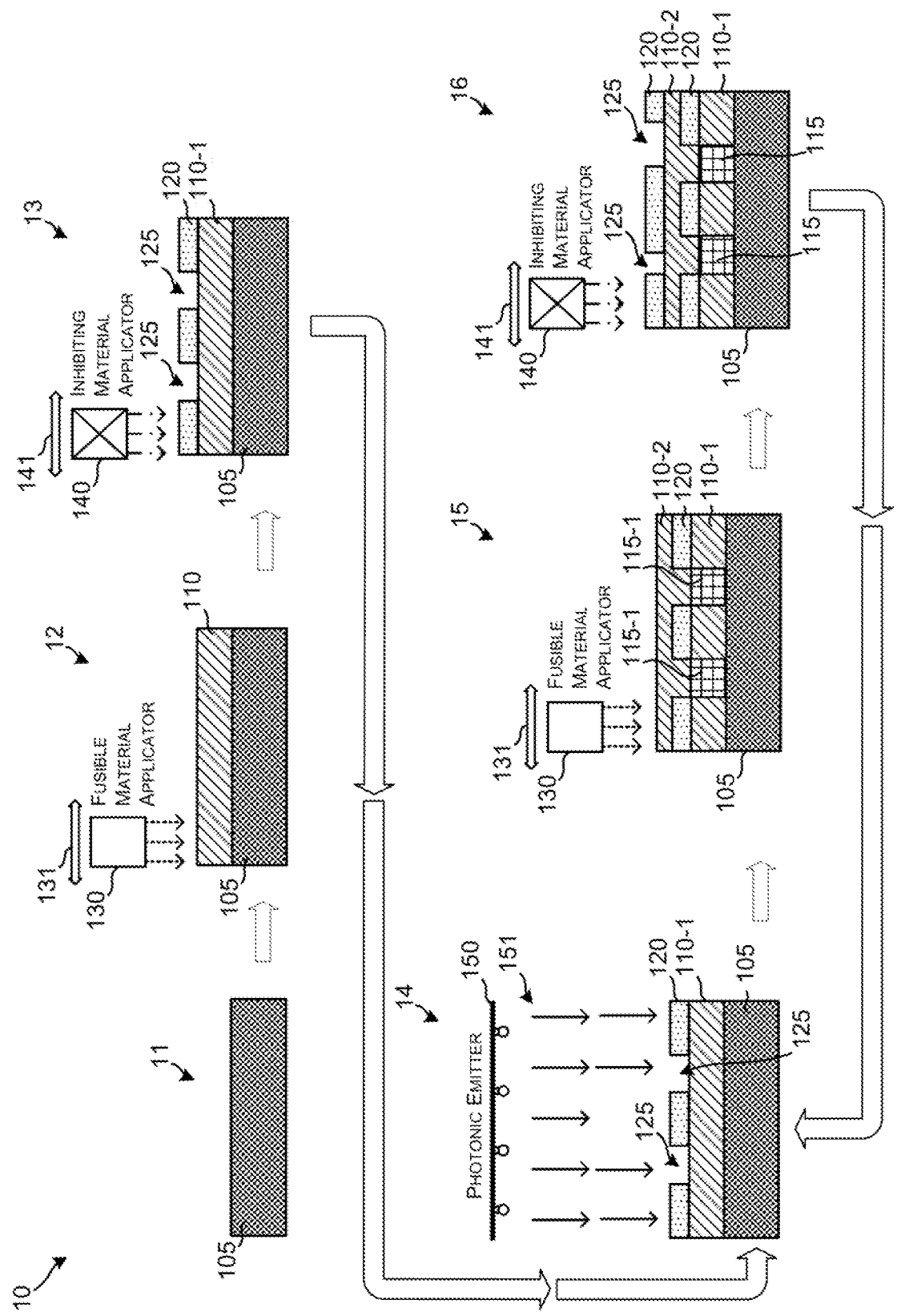
FIG. 1 illustrates an example three-dimensional printing process that uses photonic fusing of materials.

FIG. 1 illustrates an example process 10 for generating a three-dimensional object using photonic fusing, according to various implementations of the present disclosure. As shown, the process 10 can begin at reference 11 by providing a substrate 105. In some implementations, substrate 105 can be composed of and/or include materials similar to the fusible materials used in other parts of the process. For example, the substrate 105 can include a metal, plastic, wood, glass, ceramic, or other material substrate formed in a separate process.

The substrate 105 can include a disposable and/or a reusable platform that a corresponding three-dimensional printing device can manipulate while handling the other processes of the three-dimensional printing. For example, the substrate 105 can be moved by the three-dimensional printer in multiple dimensions according to the needs of the processes described herein. For example, the substrate 105 can be moved relative to other elements of the three-dimensional printer to facilitate, improve, or optimize the results of the various three-dimensional printing processes.

At reference 12, the example process 10 can include laying down a layer of fusible material 110 using a fusible material applicator 130. In some examples, the fusible material applicator 130 can include a print head type applicator that moves relative to the substrate 105 in directions such as 131. In some implementations, the fusible material applicator 130 can include a substrate wide arrangement such that the layer 110 can be laid down in a single pass over the substrate 105 having a particular dimension. For example, the fusible material applicator 130 can include a "page-wide-array" of jets or openings that release the layer of fusible material 110 on the substrate 105 as it moves in the directions indicated by arrow 131.

To achieve layers of fusible material 110 of variable thickness, the fusible material applicator 130 can make multiple passes over the substrate 100 tend to build up the layer to a specific thickness. In other examples, the rate at which the fusible material applicator 130 lays down of the fusible material layer 110 can be adjusted to achieve a particular thickness. Accordingly, implementations of the present invention can apply a lay of fusible material that is as thin as one particle of fusible material.

Once a layer of fusible material 110 is laid down, an inhibiting material applicator 140 can lay down a patterned layer of inhibiting material 120 at reference 13. In one example, the pattern of the patterned layer of inhibiting material 120 can include a negative of the desired layer to be fused in that particular layer of the three-dimensional object. As such, the patterned layer of inhibiting material 120 can establish a number of exposed regions 125 of the fusible material layer 110 and corresponding blocked regions of the fusible material 110 under the areas covered by or in contact with the inhibiting material 120. The patterned layer of inhibiting material 120 can be based on a corresponding model of the desired three-dimensional object.

The inhibiting material applicator 140 can include any type of printing apparatus capable of applying the pattern of inhibiting material 120 on the fusible material layer 110. For example, the inhibiting material applicator 140 can include an inkjet (e.g., thermal inkjet, a piezoelectric inkjet, etc.) or a sprayer that can selectively apply a liquid or a semi liquid (e.g., a gel) layer of inhibiting material 120 onto the layer of fusible material 110.

The inhibiting material applicator 140 can move relative to the substrate 105 and/or the fusible material layer 110 along direction 141. In various examples, the direction 141 can include a two-dimensional or three-dimensional degree of freedom by which to apply the inhibiting material 120. In some implementations, the inhibiting material applicator 140 can include a page-wide-array print head or a scanning print head that moves across one dimension of the fusible material layer 110 while scanning across another dimension. In any such implementations, the distance between the inhibiting material applicator 140 and the fusible material layer 110 can be varied to accommodate and/or optimize the quality of the application of inhibiting material 120. For example, as the layers of fusible material 110 and inhibiting material 120 are built up, example implementations of the present disclosure can include moving the inhibiting material applicator 140 further away from the substrate 105 to provide clearance.

At reference 14, the inhibiting material layer 120 of the fusible material layer 110 can be exposed to photonic energy 151 emitted by photonic emitter 150. In some implementations, the photonic energy is provided by non-coherent light source. For example, the non-coherent light source can include a xenon (Xe) source. Such Xe sources can emit non-coherent photonic energy (e.g., electromagnetic radiation) in the range of 150 nm to 1100 nm with radiation peaks in visible and near IR below 1 micron (e.g., 475 nm, 827 nm, 885 nm, 919 nm, and 980 nm).

The photonic energy can be delivered across some or all of the surface of the topmost layers of inhibiting material 120 and fusible material 110 simultaneously in short pulses. In some implementations the pulse of photonic energy is less than 1 millisecond. Such short pulses can be used to ensure that only a single top layer of the fusible material is heated to a point of melting without dissipating energy by heating underlying layers or by significant radiation into the air. Accordingly, implementations that use short pulses of photonic energy 151 allow for melting particles while using relatively low power density.

The portions of the topmost layer of fusible material layer 110 beneath the regions 125 are exposed through the pattern of the inhibiting material layer 120 can react to the photonic energy 151 by heating to the temperature at which the fusible material 110 fuses. In some implementations, regions of the fusible material layer 110 under the pattern of the inhibiting layer 120 are protected from the photonic energy 151, and therefore do not to fuse.

Implementations of the present disclosure can include inhibiting materials 120 that use various mechanisms to inhibit the fusing of the fusible material 110. In one example implementation, the inhibiting material 120 can include a material that reflects or absorbs electromagnetic radiation within the spectral range of the photonic emitter 150.

In one example, the inhibiting material 120 can include a white ink that includes reflective additives, such as titanium oxide ($TiO_2$). Example white inks can reflect electromagnetic radiation in UV, visible, and near-IR regions while being transport to wavelengths above 1 micron. In other implementations, the inhibiting material 120 can include a multilayer structure that provides an interference filter that selectively reflects the electromagnetic radiation of the photonic emitter 150. For example, the reflective material can comprise layers of different materials applied by the inhibiting material applicator that in combination form an interference dielectric mirror with a rejection band that corresponds to the spectral range of the photonic emitter 150. In such implementations, photonic energy 151 incident on the surface of the reflective material is reflected away from the underlying fusible material 110, thus shielding the underlying fusible material 110.

In another example, the inhibiting material 120 can include material that quickly absorbs the photonic energy 151 but does not fuse or is otherwise thermal insulator or nonconductor. For example, the inhibiting material layer 120 can include a layer of material that absorbs the electromagnetic radiation from the photon emitter 150 (e.g., Xe radiation), melts and/or evaporates during the light pulse, thus shielding the underlying fusible material layer 110 from fusing. Example absorptive materials that evaporative in response applied photonic energy include, but are not limited to, polymers, latexes, and the like.

In yet another example, the inhibiting material 120 may include a chemical or physical properties that influence on the underlying fusible material that prevents it from fusing in response to the photonic energy 151.

As illustrated at reference 15, the regions 115 of the fusible material 110 left exposed through the gaps 125 in the patterned inhibiting material layer 120 can be fused by the photonic energy 151 to form solid elements in the fusible material layer 110. To form the next layer of the three-dimensional object, the fusible material applicator 130 can lay down another layer of fusible material, here designated as fusible material layer 110-2. As shown, fusible material layer 110-2 can be laid down on top of the first layer of fusible material 110-1 and the patterned layer of inhibiting material 120. As shown, the subsequent layer of fusible material 110-2 can fill in the gaps, previously designated as 125, while maintaining a substantially flat upper surface.

With the subsequent layer of fusible material 110-2 applied to the previously applied layers of fusible material 110-1 and inhibiting material 120, the inhibiting material applicator 140 can apply another patterned layer of inhibiting material 120 according to the corresponding model of the three-dimensional object. As with the previous patterned layer of inhibiting material 120, the topmost patterned layer of inhibiting material 120 can leave gaps 125 to establish exposed layers of the fusible material layer 110-2. At this point, the processes depicted at reference numerals 14, 15, and 16 can be repeated to successively build up a three-dimensional object of fusible material 115.

The wavelength, intensity, and/or duration of the photonic energy 151 can vary based on the material properties of the inhibiting material layer 120 and/or the fusible material layer 110. For example, photonic energy 151 emitted by the photonic emitter 150 can include high-intensity photonic energy the can be delivered in short pulses. In some implementations, the pulses can be delivered as a series of short pulses. In such implementations, the duration and intensity of the photonic energy 151 can aid in removal of unwanted impurities from the fusible material 110, faster fusion of the fusible material 110, limiting thermal bleeding, and promoting the fusion between layers of fusible material 110.

Figure 2:
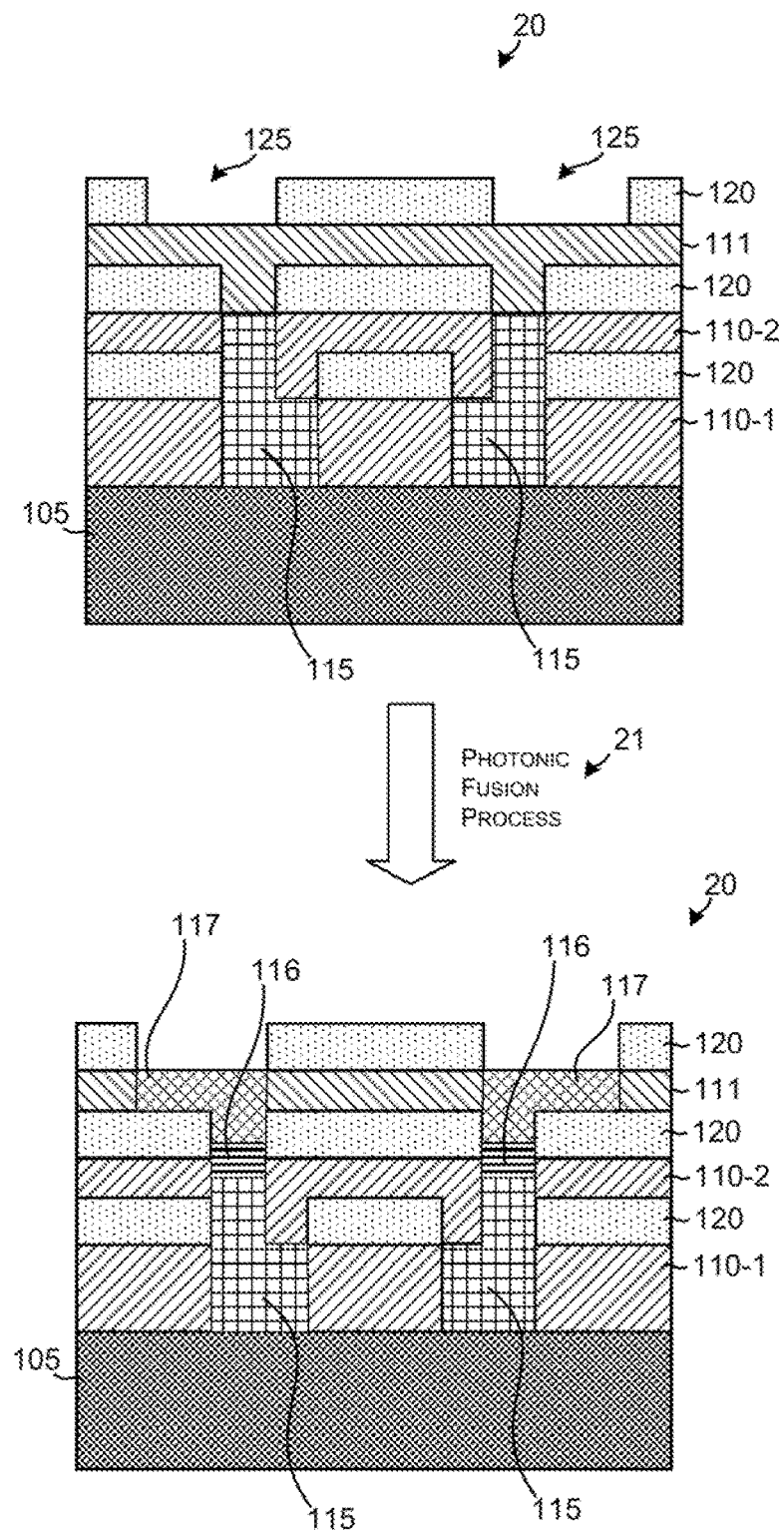
FIG. 2 illustrates example three-dimensional printing process that uses photonic fusing of materials to create alloys.

In various implementations, the material and thickness between layers of fusible material 110 can be varied to form alloys or semi alloys in the resulting three-dimensional object. FIG. 2 depicts an example of alloy formation, according to various implementations of the present disclosure. As shown in the cross sectional view at reference 20, multiple layers of fusible material 110-1 and 110-2 have been built up to generate fused material regions 115. A subsequent layer of fusible material 111 has been laid on top of the fused material regions 115, and another patterned layer of inhibiting material 120 has been laid on top of the fusible material layer 111 to establish exposed regions 125. In such implementations, the fusible material 110 and fusible material 111 can be different. For example, the fusible material can include one metal, while the fusible material layer 111 can include a different metal. When the fusible material layer 111 is exposed to the photonic energy 151, some portion can be fused with and/or combined with the underlying previously fused layer of fusible material 110 to create a localized alloy.

At reference 21, the stack of materials can be exposed to photonic infusion process according to various implementations described herein. In response to the photonic energy 151, the exposed regions of the fusible material layer 111 can be fused to generate fused fusible material regions 117 and fused fusible material regions 116. The fused fusible material regions 116 can include a mixture of the fusible materials 110 and 111. In this way, various fused fusible material regions can be established to have specific alloy properties based on the use of different fusible materials within the layers of the resulting three-dimensional object.

Figure 3:
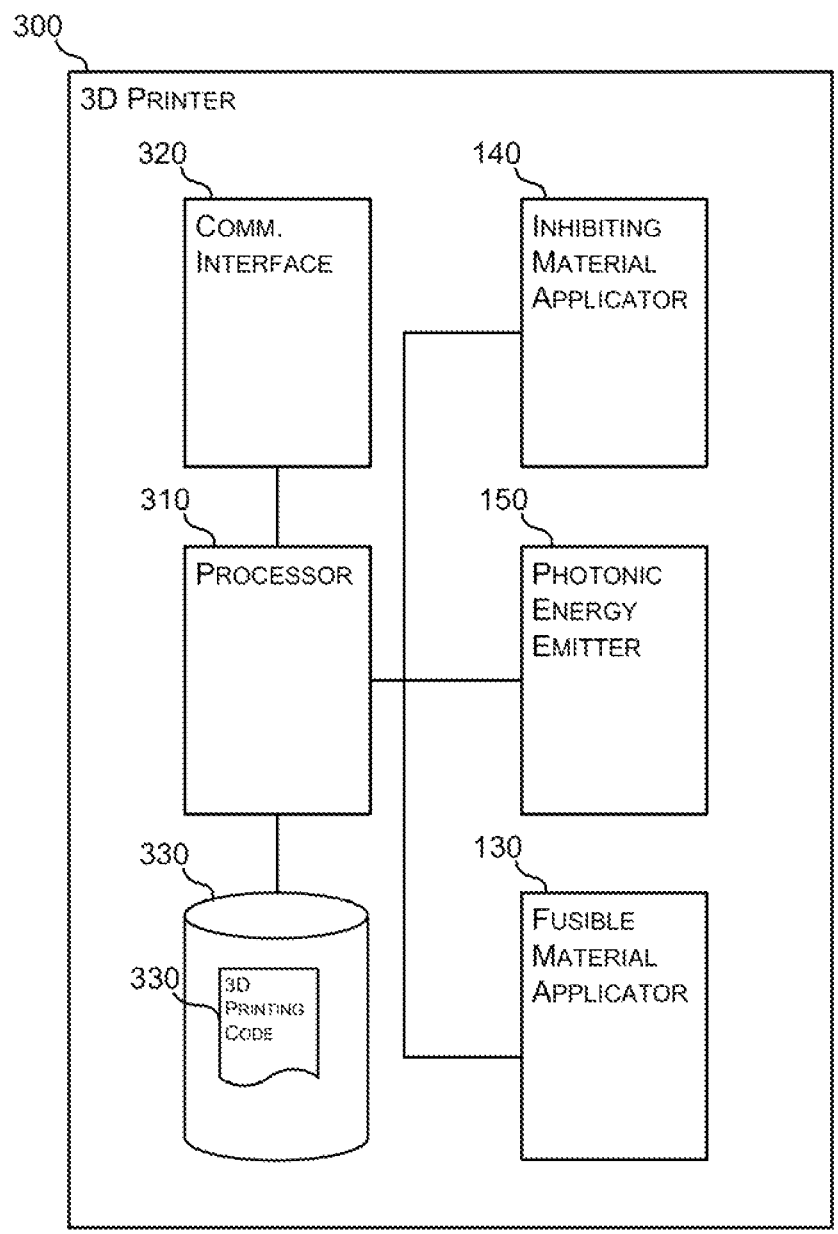
FIG. 3 depicts a schematic diagram of an example three-dimensional printer.

FIG. 3 depicts a schematic of a three-dimensional printer 300. As shown, three-dimensional printer 300 can include a processor 310 to execute machine readable executable code stored in the memory 330 to perform operations and control other components of the three-dimensional printer 300. In various examples, processor 310 may be a microprocessor, a micro-controller, an application specific integrated circuit (ASIC), or the like. According to an example implementation, the processor 310 is a hardware component, such as a circuit. The memory 330 can include a volatile or non-volatile memory, such as dynamic random access memory (DRAM), electrically erasable programmable read-only memory (EEPROM), magnetoresistive random access memory (MRAM), memristor, flash memory, floppy disk, a compact disc read only memory (CD-ROM), a digital video disc read only memory (DVD-ROM), or other optical or magnetic media, and the like, on which executable code may be stored.

The processor 310 can execute three-dimensional printing code 331. Three-dimensional printing code 331 can include instructions for generating control signals that cause the inhibiting material applicator 140, the photonic energy emitter 150, and/or the fusible material applicator 130 to implement the corresponding operations of three-dimensional printing process according to various implementations of the present disclosure. For example, the instructions included in the three-dimensional printing code 331 can cause the processor 310 to control the components of the three-dimensional printer 300 to perform the example process 100 depicted in FIG. 1 and/or the method described in reference to FIG. 4.

In some example implementations, the three-dimensional printer can include a communication interface 320. The communication interface 320 can be used by the processor 310 for sending and receiving commands in response signals to and from an external computing device, such as a desktop, laptop, or server computer. In various implementations, the communication interface 320 can include a networking communication interface, a universal serial bus (USB) interface, a parallel communication interface, a serial communication interface, or any other communication interface suitable for communicating with other electronic or computing devices. For example, the three-dimensional printer 300 can receive printing instructions and/or electronic files through the communication interface 320. The instructions or electronic files can include computer readable code comprising instructions or models that the processor 310 can use to generate a three-dimensional object using the other components of the three-dimensional printer 300 according to implementations of the present disclosure.

Figure 4:
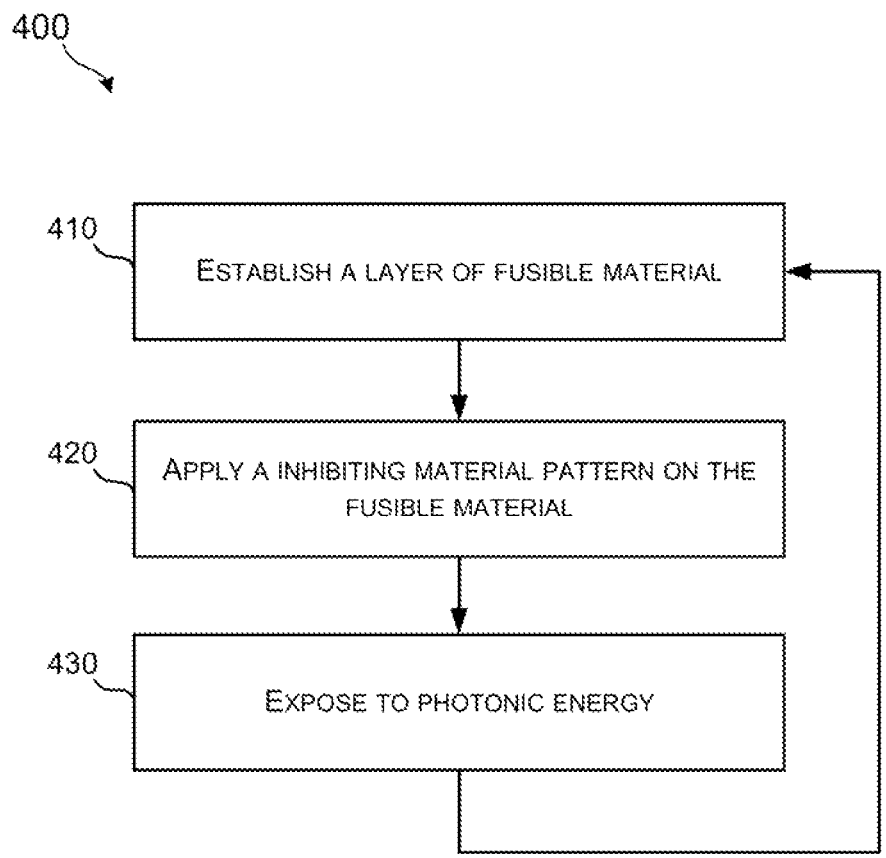
FIG. 4 is a flowchart of an example method of three-dimensional printing.

FIG. 4 is a flowchart of an example method 400 for printing the three-dimensional objects according to various implementations of the present disclosure. As shown, the method 400 can begin at box 410 in which a fusible material applicator 130 can establish a layer of fusible material 110. The layer of fusible material 110 can comprise various types of fusible material, such as, fusible powders, fusible gels, fusible slurries, fusible liquids, and the like. The thickness of the fusible material layer 110 laid down by the fusible material applicator 130 can vary based on the characteristics of the fusible material and/or the physical features of a particular layer of a resulting three-dimensional object. In some implementations, the fusible material applicator 130 can include a system for spraying, spreading, rolling out, or jetting the fusible material. As such, the fusible material applicator 130 can include various sprayers, spreaders, rollers, jets, and the like in a head unit that can scan across a base surface, substrate, or a previously applied layer of fusible material.

Once a layer of fusible material is established, an inhibiting material pattern can be applied to a surface of the layer of fusible material. In some implementations described herein, the pattern of fusible material may be printed, painted, or otherwise dispensed onto the surface of the fusible material layer to defined a number of exposed and blocked regions of the underlying layer of fusible material. The exposed regions represent areas where the fusible material can be fused to generate a particular physical element of the three-dimensional object. As described herein, the pattern of inhibiting material can be applied by inhibiting material applicator 140. In some implementations, the inhibiting material can include a reflective ink, such as a white ink containing $TiO_2$ to reflect the incident photonic energy away from the underlying fusible material.

With the pattern of inhibiting material disposed on the underlying layer of fusible material 110, a photonic emitter 150 can be used to apply a particular amount of photonic energy 151 to the regions of the fusible material 110 exposed through the pattern. The application the photonic energy 151 can cause the exposed regions of the fusible material 100 to fuse into a solid or semi solid state. In example implementations, the photon emitter 150 can use any type of high-intensity, short-duration bursts a photonic energy that expose the top surface of the stack of fusible material layers 110 and inhibiting material layers 120 in its entirety simultaneously or in sections. Such photonic energy can quickly and controllably fuse the layer of fusible material with limited to no thermal bleeding into the unexposed/blocked regions of fusible material under the inhibiting material layer 120. Once the regions of a particular fusible material layer 110 are fused, the processes in boxes 410, 420, and 430 can be repeated to build up individual layers of the three-dimensional object until it is complete.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A three-dimensional printing device comprising:
    a fusible material applicator to apply a layer of a first fusible material;
    an inhibiting material applicator to apply a patterned layer of inhibiting material to establish exposed regions of the layer of the first fusible material and blocked regions of the layer of the first fusible material based on information corresponding to a three-dimensional model;
    a photonic energy emitter to apply photonic energy to fuse at least some of the exposed regions of the layer of the first fusible material simultaneously, wherein the photonic energy emitter comprises a xenon source;
a processor communicatively coupled to the fusible material applicator, the inhibiting material applicator, and the photonic energy emitter to control operation of the fusible material applicator, the inhibiting material applicator and the photonic energy emitter; and
a non-transitory computer readable medium coupled to the processor, wherein the non-transitory computer readable medium includes instructions which, when executed by the processor, cause the processor to:
control the inhibiting material applicator to apply the patterned layer of inhibiting material in a pattern comprising a negative of a desired layer to be fused in a particular layer of the three-dimensional model; and
control the photonic energy emitter to emit the photonic energy as a plurality of pulses to the exposed regions of the layer of the first fusible material, wherein each pulse of the plurality of pulses is less than 1 millisecond.

2. The three-dimensional printing device of claim 1, wherein the instructions further cause the processor to:
control the photonic energy emitter is to emit a first pulse of the plurality of pulses to remove unwanted impurities from the exposed regions of the layer of the first fusible material and to emit subsequent pulses of the plurality of pulses to heat the exposed regions of the layer of the first fusible material.

3. The three-dimensional printing device of claim 1, wherein the inhibiting material applicator comprises an inkjet.

4. The three-dimensional printing device of claim 1, wherein the inhibiting material comprises a reflective ink, an interference filter, a heat absorptive material that vaporizes, or a thermal insulator.

5. The three-dimensional printing device of claim 1, wherein the photonic energy emitter applies the photonic energy comprising a spectral range between 0.2 micron and 1.5 micron.

6. The three-dimensional printing device of claim 1, wherein the photonic energy emitter emits electromagnetic radiation in a spectral range between 150 nanometers (nm) and 1100 nm with radiation peaks in a visible range.

7. The three-dimensional printing device of claim 6, wherein the radiation peaks are below 1 micron.

8. The three-dimensional printing device of claim 1, wherein the first fusible material comprises a first metal and the photonic energy emitter is to melt the first metal.

9. The three-dimensional printing device of claim 8, wherein the fusible material applicator is to apply a layer of a second fusible material on top of the layer of the first fusible material, wherein the second fusible material comprises a second metal that is different from the first metal.

10. The three-dimensional printing device of claim 9, wherein the photonic energy emitter is to melt the first metal and the second metal to form an alloy of the first metal and the second metal.

11. The three-dimensional printing device of claim 1, wherein the inhibiting material comprises a material that reflects the photonic energy or absorbs the photonic energy within a spectral range emitted by the photonic energy emitter.

12. The three-dimensional printing device of claim 1, wherein the inhibiting material comprises a white ink that includes reflective additives.

13. The three-dimensional printing device of claim 12, wherein the reflective additives comprises titanium oxide.

14. The three-dimensional printing device of claim 10, wherein the patterned layer of inhibiting material is applied between the layer of the first fusible material and the layer of the second fusible material to prevent portions of the layer of the first fusible material and portions of the layer of the second fusible material from melting to form the alloy when exposed to the photonic energy.

* * * * *